(12) United States Patent  (10) Patent No.: US 7,797,264 B2
Iyer et al.  (45) Date of Patent: Sep. 14, 2010

(54) DETECTING AND DISPLAYING EXCEPTIONS IN TABULAR DATA

(75) Inventors: Raman S. Iyer, Redmond, WA (US); C. James MacLennan, Redmond, WA (US); Ioan Bogdan Crivat, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 390 days.

(21) Appl. No.: 11/670,735

(22) Filed: Feb. 2, 2007

(65) Prior Publication Data

US 2008/0189238 A1   Aug. 7, 2008

(51) Int. Cl.
*G06F 17/00*   (2006.01)
(52) U.S. Cl. ........................................ 706/45; 707/776
(58) Field of Classification Search .................. 706/52, 706/45; 707/6, 100, 776
See application file for complete search history.

(56) References Cited

U.S. PATENT DOCUMENTS

| | | | |
|---|---|---|---|
| 5,325,466 A | 6/1994 | Kornacker | |
| 5,367,619 A | 11/1994 | Dipaolo et al. | |
| 5,410,704 A | 4/1995 | Norden-Paul et al. | |
| 5,483,355 A | 1/1996 | Overton | |
| 6,189,010 B1 | 2/2001 | Isip, Jr. | |
| 6,192,379 B1* | 2/2001 | Bekenn | 715/206 |
| 6,304,876 B1 | 10/2001 | Isip, Jr. | |
| 6,684,215 B1 | 1/2004 | Saracco | |
| 7,028,057 B1 | 4/2006 | Vasudevan et al. | |
| 7,065,534 B2* | 6/2006 | Folting et al. | 1/1 |
| 7,092,941 B1* | 8/2006 | Campos | 1/1 |
| 7,426,059 B2* | 9/2008 | Broda et al. | 358/1.3 |
| 7,490,085 B2* | 2/2009 | Walker et al. | 707/10 |
| 2003/0055664 A1 | 3/2003 | Suri | |
| 2004/0073534 A1* | 4/2004 | Robson | 707/1 |
| 2004/0083199 A1 | 4/2004 | Govindugari et al. | |
| 2004/0122706 A1* | 6/2004 | Walker et al. | 705/2 |
| 2004/0123101 A1 | 6/2004 | Rineer et al. | |
| 2004/0226002 A1 | 11/2004 | Larcheveque et al. | |
| 2005/0028046 A1* | 2/2005 | McArdle | 714/48 |
| 2005/0097072 A1 | 5/2005 | Brown et al. | |
| 2005/0198011 A1 | 9/2005 | Barsness et al. | |
| 2005/0228808 A1* | 10/2005 | Mamou et al. | 707/100 |
| 2005/0283837 A1 | 12/2005 | Olivier | |
| 2006/0010112 A1 | 1/2006 | Crivat et al. | |
| 2006/0055945 A1 | 3/2006 | Fazakerly | |
| 2006/0059063 A1* | 3/2006 | LaComb et al. | 705/35 |
| 2006/0100974 A1 | 5/2006 | Dieberger | |

(Continued)

OTHER PUBLICATIONS

Crivat et al. Detect Anomalies in Excel Spreadsheets. Advisor, Oct. 2004.*

(Continued)

*Primary Examiner*—Donald Sparks
*Assistant Examiner*—David H Kim
(74) *Attorney, Agent, or Firm*—Workman Nydegger

(57) ABSTRACT

Data expressed as tabular data having columns and rows can be analyzed and data determined to be an exception can be flagged. In addition, reasons for flagging such data as exceptions can be presented to a user to facilitate further analysis and action on the data. A predictive analysis component can utilize a clustering algorithm with predictive capabilities to autonomously analyze the data. Periodic re-analysis of the data can be performed to determine if exceptions have changed based on new or modified data.

15 Claims, 8 Drawing Sheets

U.S. PATENT DOCUMENTS

2006/0253205 A1    11/2006  Gardiner
2007/0112754 A1*   5/2007   Haigh et al. .................. 707/5
2008/0189639 A1    8/2008   Iyer

OTHER PUBLICATIONS

Campos et al. Data-Centric Automated Data Mining. ICMLA, Dec. 2005.*
Tan et al. Introduction to Data Mining, chapter 8. May 2005.*
Tang, Z. H. and MacLennan, J. Data Mining with SQL Server 2005. Chapters 1, 7, 16 & 17. John Wiley & Sons. Oct. 2005.*
Crivat et al. Detect Anomalies in Excel Spreadsheets. Advisor. Oct. 2004.*
Improve Data Validation for More Accurate Results. SPSS. http://www.spss.com.sg/spss/Downloads/spss/14.0%20SPSS%20Data%20Validation.pdf. Last accessed Dec. 7, 2006.
Karolyn Duncan, et al. Rule Based Data Cleansing for Data Warehousing. http://www.dama-pdx.org/Cleasing.PDF. Last accessed Dec. 7, 2006.
Andreas Arning, et al. A Linear Method for Deviation Detection in Large Databases. http://www.almaden.ibm.com/software/projects/iis/hdb/Publications/papers/kdd96_dev.ps.gz. Last accessed Dec. 7, 2006.
Caroline Sporleder, et al. Spotting the 'Odd-one-out': Data-Driven Error Detection and Correction in Textual Databases. http://ilk.uvt.nl/~caroline/papers/atem06.pdf. Last accessed Dec. 7, 2006.
Peng Gong. Error detection through consistency checking. http://www.cnr.berkeley.edu/~gong/PDFpapers/GongMulanError.pdf. Last accessed Dec. 7, 2006.
OA mailed Feb. 25, 2009 for U.S. Appl. No. 11/670,783, 26 pages.
Tang, Z.H. and MacLennan, J.; Data Mining with SQL Server 2005. Chapters 1, 7, 16 & 17, John Wiley & Sons, Oct 2005.
U.S. Appl. No. 11/670,783, filed Nov. 13, 2009, Office Action
U.S. Appl. No. 11/670,783, Apr. 29, 2010, Notice of Allowance.

* cited by examiner

DETECTING AND DISPLAYING EXCEPTIONS IN TABULAR DATA

BACKGROUND

Electronic storage mechanisms have enabled accumulation of massive amounts of data. For instance, data that previously required volumes of books for recordation can now be stored electronically without expense of printing paper and with a fraction of physical space needed for storage of paper. Many users employ database systems or other systems for storage and organization of data.

To maintain data in a readily retrievable and understandable manner, the data can be arranged in a tabular format or can be represented as a tabular format. That is to say, the tabular data can be organized in rows and columns, wherein each row can be regarded as an entity described by properties that are contained in the columns of the row. Exceptions, which are rows that do not conform to the rules or generalizations that govern the properties of most other rows, can be present within the tabular data. These exceptions can be diagnosed as errors in the data collection process and corrected accordingly. The exceptions may also be diagnosed as real problems and action can be taken to correct and/or make use of the exceptional data instances.

SUMMARY

The following presents a simplified summary in order to provide a basic understanding of some aspects of the disclosed embodiments. This summary is not an extensive overview and is intended to neither identify key or critical elements nor delineate the scope of such embodiments. Its purpose is to present some concepts of the described embodiments in a simplified form as a prelude to the more detailed description that is presented later.

In accordance with one or more embodiments and corresponding disclosure thereof, various aspects are described in connection with automatically detecting one or more exceptions in tabular data and displaying the exceptions and/or the inferred cause or causes of the one or more exceptions. Such detection and explanation of exceptions can be facilitated through clustering algorithms with predictive capabilities, for example. The set of patterns utilized in detecting the one or more exceptions can be periodically refreshed allowing for continuous detection and notification of exceptions, which may change over time.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

DETAILED DESCRIPTION

Figure 1:
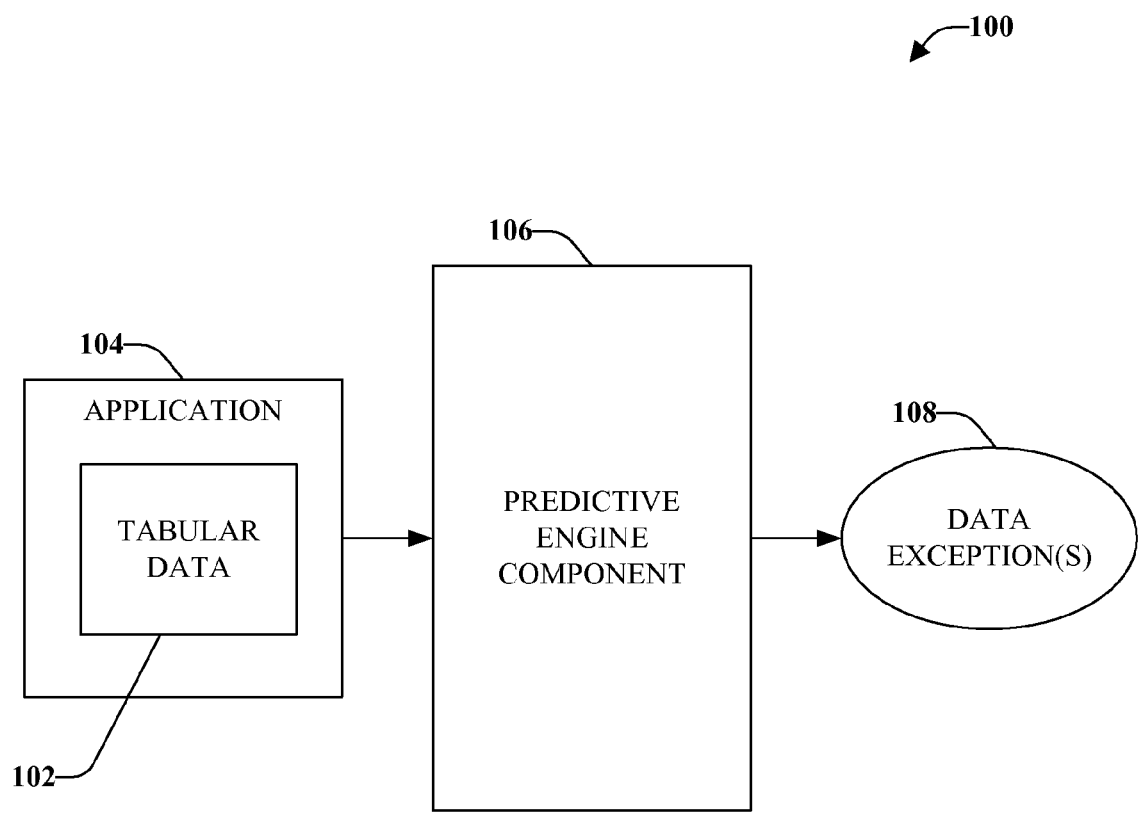
FIG. 1 illustrates a high-level block diagram of a system for automatically detecting exceptions in tabular data.

Various embodiments are now described with reference to the drawings. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed embodiments.

Various embodiments will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a high-level block diagram of a system 100 for automatically detecting exceptions in tabular data. System 100 can be configured to automatically find exceptions inside tabular data without user guidance (e.g., a priori knowledge). System 100 can further be configured to present information explaining which column of a particular row is most likely the reason for considering the entire row an exception.

In further detail, system 100 includes tabular data 102, which can be any form of tabular data 102 from an application 104. The tabular data 102 can be in various forms, such as in a server in a relational form, in a storage media on a client application, or in numerous other forms. The tabular data 102 can be in a variety of formats, such as a spreadsheet, XML data that can be represented as tabular data, a grid based application, a form, a report, a webpage, a printout, or other data that can be divided into fields. Thus, tabular data, as used herein, can be any data that is user visible and/or user interactive.

The tabular data information 102 can be provided to a predictive engine component 106 that can be configured to analyze the tabular data 102 and infer which row or rows are exceptions inside that tabular data. Predictive engine component 106 can be configured to analyze an entire row and the combinations within those rows can be analyzed to infer an exception. A clustering algorithm with predictive capabilities for finding and explaining the exceptions can be utilized by predictive engine component 106 to analyze the rows and make an inference of an exception within those rows. The predictive engine component 106 can output the inferred data exceptions 108, which can be presented to a user.

As new information is entered by a user and/or entity (e.g., the Internet, another system, a computer, . . . ), hereinafter referred to as user, predictive engine component 106 can automatically update the clustering algorithm with predictive capabilities to determine whether there is the same or a different exception. For example, the new or modified data may cause a different row to be the exception row or the same row can still be the exception row but a different column within that row is the potential cause of the exception due to the new or modified data. The analysis results (e.g., why that particular row is an exception) can be presented to the user. In such a manner, the information can be periodically refreshed and/or automatically refreshed when there a change to one or more entity, row or column and/or a new entity, row or column is added to (or deleted from) the tabular data.

Figure 2:
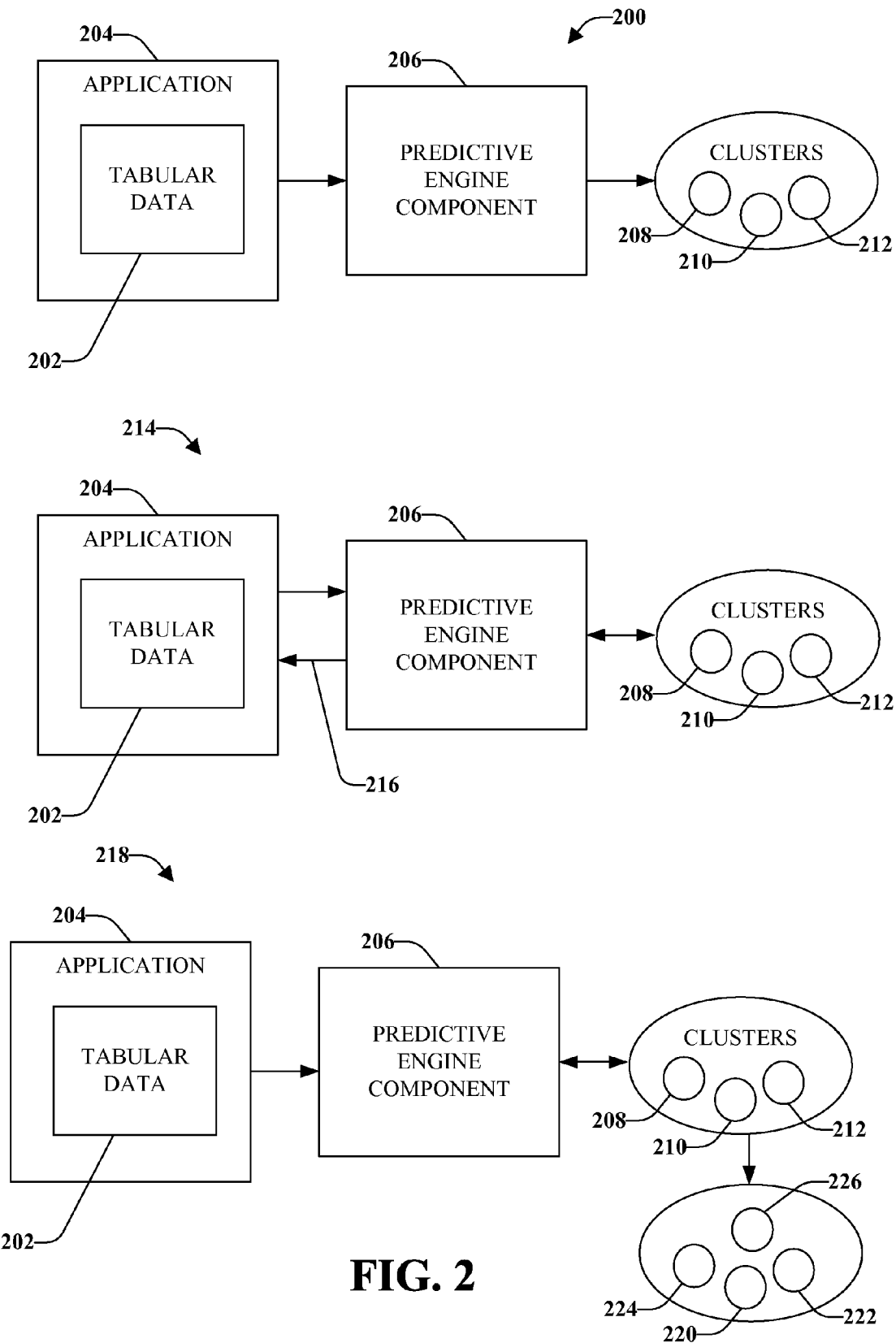
FIG. 2 illustrates a block diagram of a system for detecting exceptions in accordance with the embodiments presented herein.

FIG. 2 illustrates a block diagram of a system 200 for detecting exceptions in accordance with the embodiments presented herein. Tabular data 202 within an application 204 can be uploaded to a predictive engine component 206 as a row set parameter. Predictive engine component 206 can build a model for detecting exceptions by detecting one or more clusters within the row set parameters, illustrated as clusters 208, 210 and 212, although any number of clusters may be detected.

As illustrated by system 214, the model can be applied to the tabular data 202 by predictive engine component 206 to detect the exceptions. One row of tabular data 202 at a time can be evaluated by predictive engine component 206. The closest cluster to the row under consideration can be found, such as cluster 208, for example, and the distance to the closest cluster can be measured by predictive engine component 206. If the exception is farther than a threshold, the distance on all coordinates or columns of the tabular data to the cluster is computed. The evaluation results are returned to the tabular data, at 216. The row is marked as an exception and the cause of the exception is emphasized, if necessary.

Periodically changes in the data pattern can be detected as illustrated, by system 218. Tabular data 202 can be updated as a row set parameter and communicated to predictive engine component 206. New clusters 220, 222, 224 and 226 can be detected by updating the model on the fly. In such a manner as new data is entered or existing data is modified, different rows or the same rows can be marked as an exception based on the same or different reasoning.

By way of example and not limitation, tabular data includes rows that represent customers that may or may not own a bicycle. Each row in the tabular data has four columns: "Region" (Unites States or Europe); "Distance from work" (in miles); "Number of cars owned" (0, 1, 2 or more); and "Has a Bike?" (true if the customer has a bike, false otherwise). This tabular data 202 can be communicated to a predictive engine component 206 that runs a clustering algorithm and finds the following clusters:

Cluster 1: Region=Europe; Distance form Work=less than 5 miles; Number of cars owned=0 or 1; and Has a Bike=false.

Cluster 2: Region=Europe; Distance from Work=greater than 5 miles, Number of cars owned=2 or more; Has a Bike=false.

A row to be input and evaluated by predictive engine component 106 is: Region=Europe, Distance from Work=2, Number of cars owned=1, Has a Bike=False. Predictive engine component 206 might evaluate the row and determine that this input row is closest to the first cluster (Cluster 1), because more columns match the description of Cluster 1 than the description of Cluster 2. However, one column (Has a Bike) does not match the description of Cluster 1, therefore, the likelihood of the row is relatively low. Low likelihood for a row indicates that this row is unlike the most common groups of rows and can represent an exception. For purposes of this example, the Input Row is below a threshold and is marked as an exception. For Cluster 1, based on a prediction mechanism, the predicted typical row might appear as: (Region=Europe, Distance from Work=2.5 miles, Number of cars owned=0.5, Has a Bike=true). When comparing, column by column, with the input row, the predictive engine component 206 can mark the "Has a Bike" column as being most different. As a result, system 200 can mark the row as an exception and can mark the "Has a Bike" column as the most likely cause of the exception. In such a manner, exception detection can be enhanced by providing autonomous and continuous exception row detection by utilizing a clustering algorithm with predictive capabilities.

Figure 3:
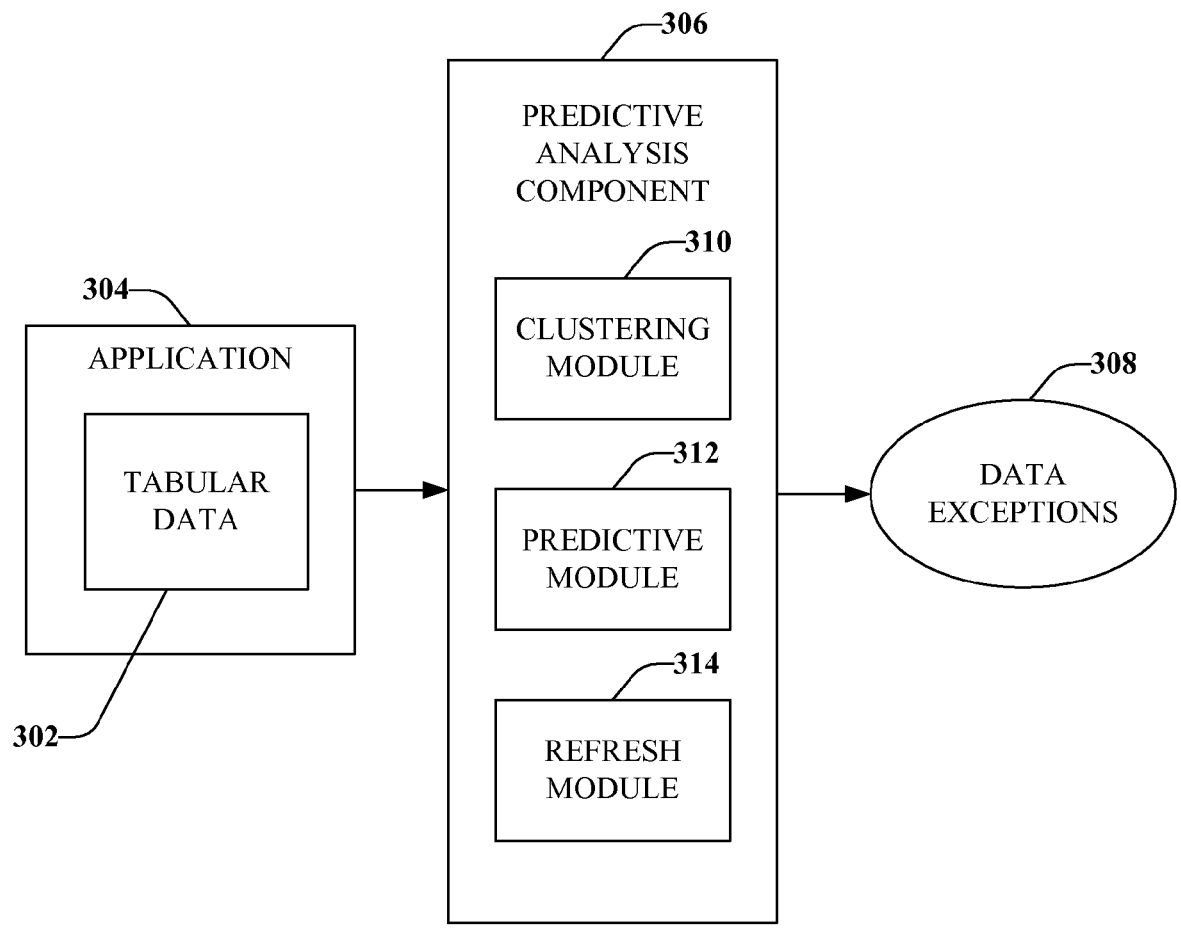
FIG. 3 illustrates a block diagram of a system that autonomously evaluates data, determines exceptions within the data and provides potential causes for such exceptions.

FIG. 3 illustrates block diagram of a system 300 that autonomously evaluates data, determines exceptions within the data and provides potential causes for such exceptions. System 300 does not have to know anything about the data except the data contained in the columns and rows, thus, no user information is needed by system 300. System 300 includes tabular data 302 (e.g., data expressed or represented as columns and rows) included in an application 304. Also included is a predictive analysis component 306 that can be configured to analyze the tabular data 302 and predict which rows do not conform the rules or generalizations that govern the properties of most other rows and present such rows and associated information as exceptions 308.

The tabular data 302 and associated application 304 can be located on two or more machines. That is to say, the disclosed computations, modeling and predictive analytics can be executed on a server independent of the location of the data. For example, the data 302 can be retained in a client machine and the predictive analysis component 306 located on another machine, such as a remote server. Therefore, a device with low computing power can interact with a server machine, which can perform the computational complexities described herein. The interaction can be through various connections, both wired and wireless.

Predictive analysis component 306 can include a clustering module 310 that can be configured to create a clustering model based on the tabular data 302. A clustering model can leverage data mining technology, which involves searching through large amounts of data to uncover patterns and relationships contained therein. In the data-mining world, there are at least two operations that are performed with data. These operations are training (finding patterns in data) and prediction (applying such patterns to infer new/missing knowledge about data). For example, data mining can be used to explore large detailed business transactions such as credit card transactions to determine the most influential factors common to non-profitable customers.

The clustering module 310 can utilize a probabilistic clustering algorithm that can analyze all rows contained in the data and group or cluster the rows by field (e.g., cell, column) similarity. Each row can represent a data point in a multi-dimensional bell curve that has peaks and troughs As a data point moves away from the peak of the bell curve, the probability that it is within a cluster represented by that peak diminishes. These outliers (e.g., exceptions) are the cases that do not fit well within any particular cluster and, therefore, the data point is in a trough or outside the area of a cluster. In other words, the clustering module 310 groups the multitude of rows into one or more groups and identifies at least one row that is not grouped with at least one other row.

The cluster to which the row (e.g., outlier) is closest to is determined and a measurement from the center of the cluster (e.g., peak of the curve) is taken. If the measurement exceeds a certain threshold, that particular row might be an exception. The bell curve is in hyper-dimensional space and may have multiple coordinates, therefore, the distance can be measured from the center of each individual coordinate to determine the coordinates that seem to be the farthest from the center of the cluster. This can determine which column or columns were the likely cause of the exception. Thus, clustering module 310 can determine which row is an exception.

A predictive module 312 can be configured to predict which column or columns within a row, identified as an exception, is the most likely cause for that row being an exception. The predictive module 312 can make such a determination by analyzing all clusters and utilizing a weighted average of the results. For example, a particular row (or data point) belongs 80% to Group A (which is 20% male) and 20% to Group B (which is 40% male). Predictive module 312 can perform a weighted averaging of these percentages to determine what the gender value should be (prediction) for a particular case.

A refresh module 314 can be configured to refresh or trigger the clustering module 310 and/or the predictive module 312 to re-evaluate the tabular data 302 to determine if any change, addition and/or deletion of data has made a different row an exception and/or has made a different column or columns the potential cause of that row being an exception. Refresh module 314 can trigger the other system components to perform the re-evaluation after a certain interval or when data changes or additions are detected. In such a manner, system 300 autonomously detects and displays exceptions on the fly.

Figure 4:
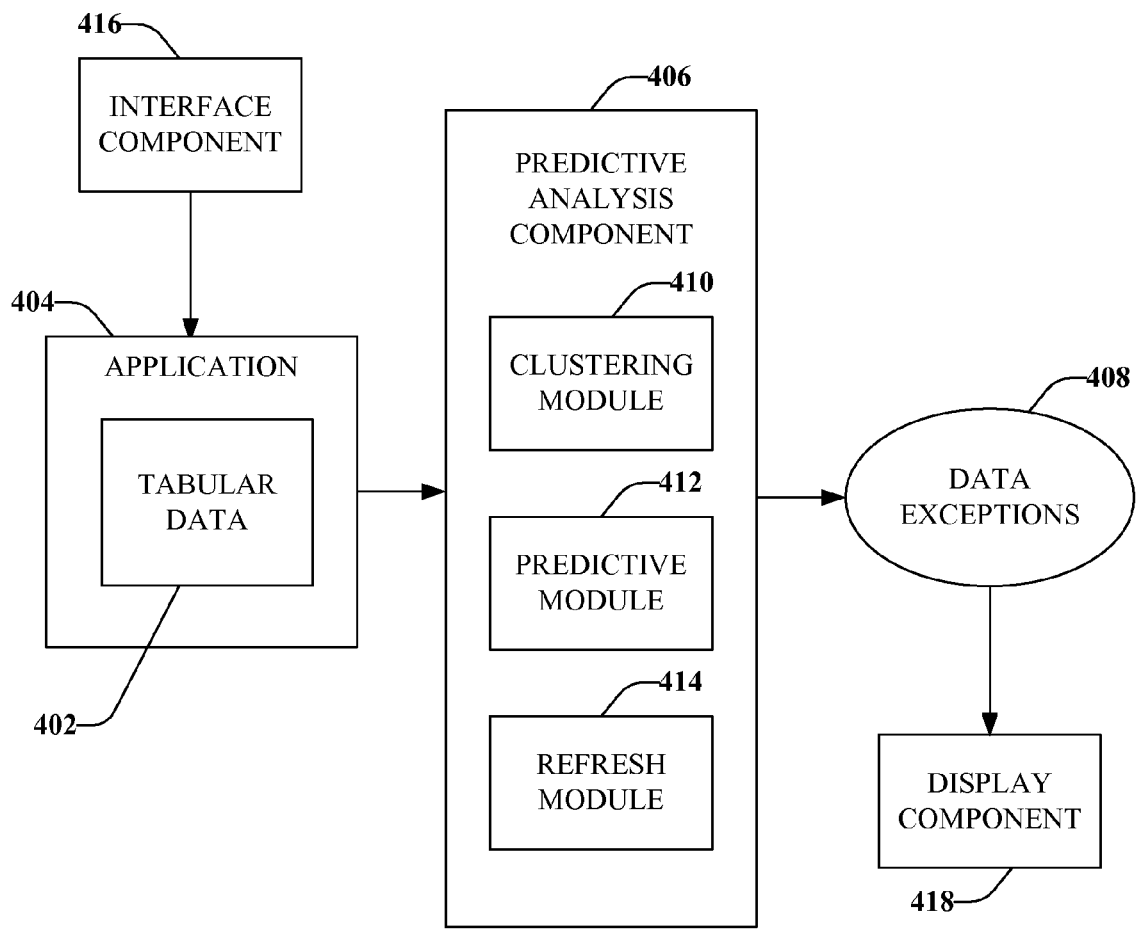
FIG. 4 illustrates a block diagram of a system for providing autonomous analysis of tabular data.

FIG. 4 illustrates a block diagram of a system 400 for providing autonomous analysis of tabular data. System 400 is similar to the systems shown and described above and includes tabular data 402 in an application 404 that is evaluated by a predictive analysis component 406 for rows that are considered data exceptions 408. Included in predictive analysis component 406 can be a clustering module 410 that can be configured to develop a clustering model based on the world, which is the world as seen through the data 402. Thus, all data included in a tabular database (or other application) is clustered or grouped by similar rows. Clustering module 410 develops a model of what the world looks like, as seen through the data. Each row is evaluated against this cluster and analyzed to determine if it fits into the world as established by the data. Thus, system 400 does not need a priori knowledge of the data.

Also included is a predictive module 412 that can be configured to predict which column or columns within a row, identified as an exception, is the most likely cause for that row being an exception. As data is modified, new data entered and/or periodically a refresh module 414 can be configured to automatically invoke the clustering module 410 and/or predictive module 412 to re-analyze the exception and it potential cause based in part on the new or modified data.

A user can interact with system, to enter, modify or delete data through an interface component 416. The user can also interact with refresh module 414 to invoke reanalysis of the data as discussed above. The interface component 416 can provide various types of user interfaces. For example, the interface component 416 can provide a graphical user interface (GUI), a command line interface, a speech interface, Natural Language text interface, and the like. For example, a GUI can be rendered that provides a user with a region or means to load, import, select, read, etc. tabular data. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

The exception and its potential causes can be presented to the user, such as through display component 418, such as a graphical user interface or other interfaces. The information can be presented through various techniques such as highlighting the exception row and/or column(s), changing the font, font style, font size, font color, underline, and so forth.

Figure 5:
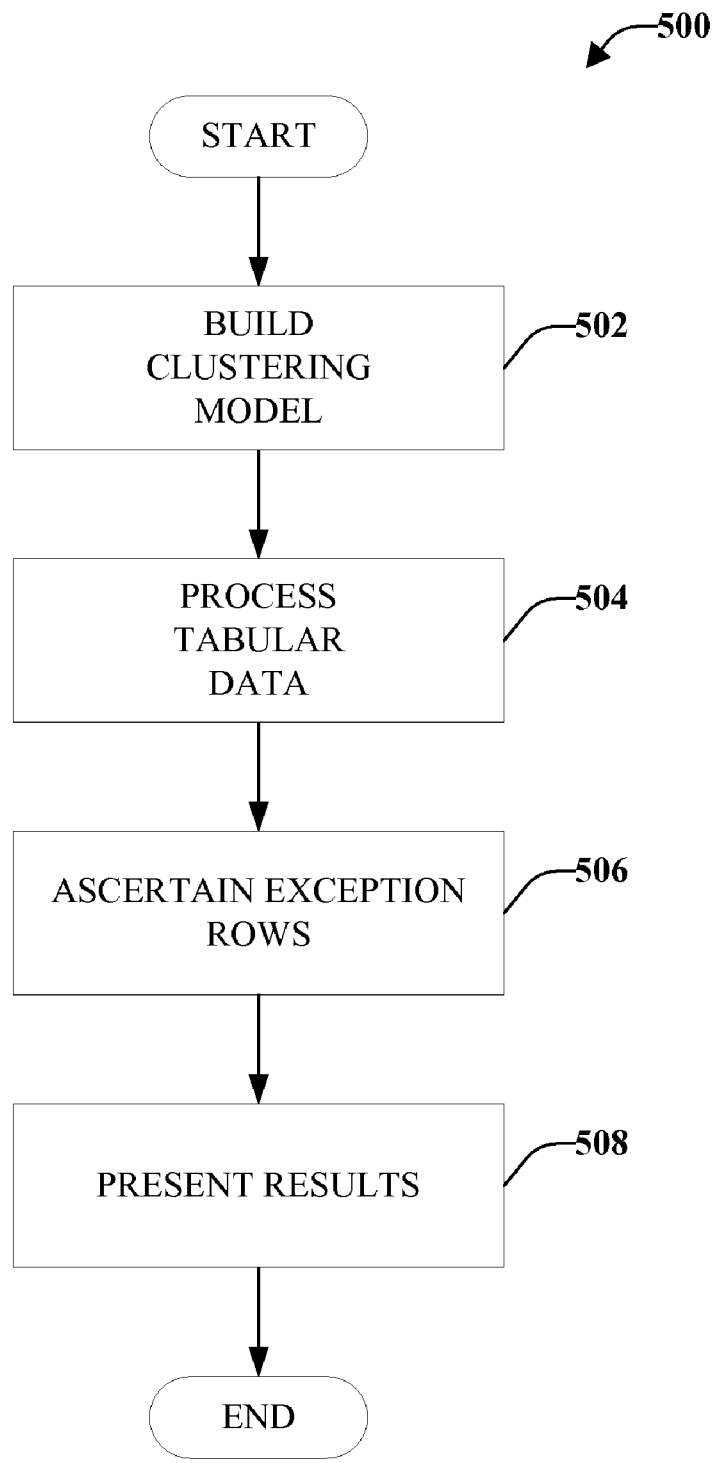
FIG. 5 illustrates a method for evaluating tabular data and determining which rows, if any, represent exceptions within the tabular data.
Figure 6:
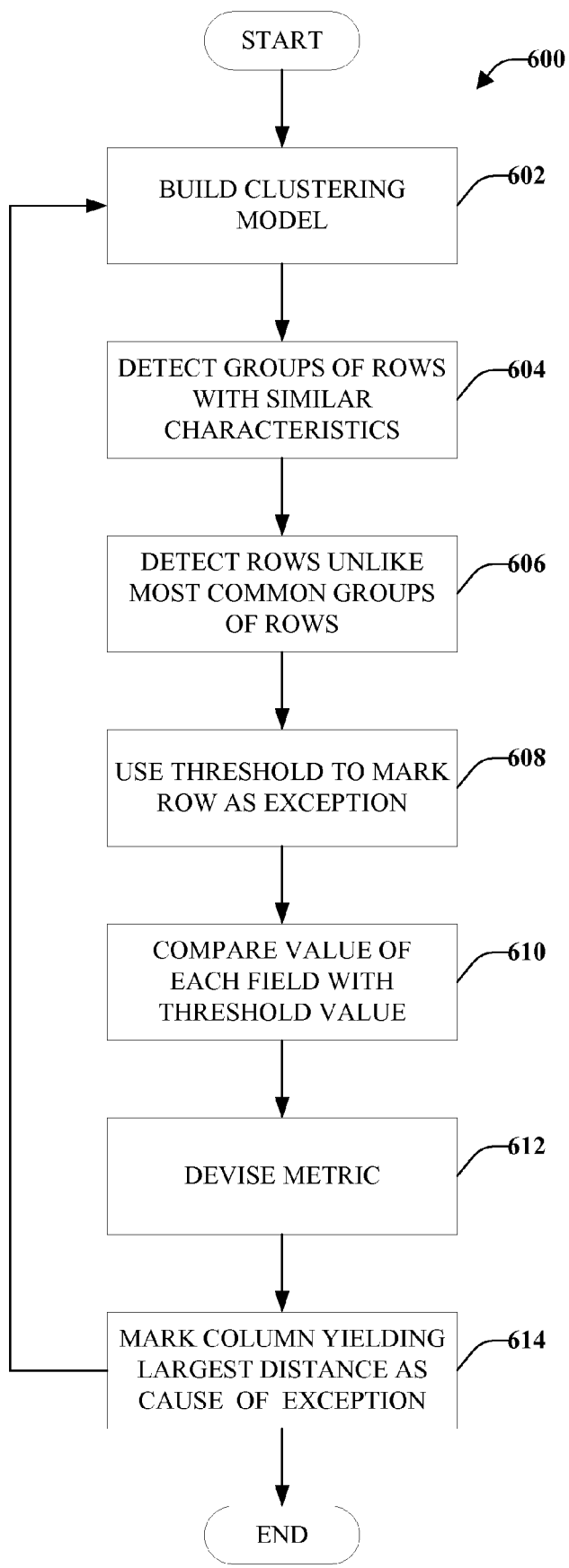
FIG. 6 illustrates a method for finding differences in tabular data and providing reasons for such differences.

In view of the exemplary systems shown and described above, methods that may be implemented in accordance with the disclosed subject matter, will be better appreciated with reference to the flow charts of FIGS. 5 and 6. While, for purposes of simplicity of explanation, the methods are shown and described as a series of blocks, it is to be understood and appreciated that the disclosed embodiments are not limited by the number or order of blocks, as some blocks may occur in different orders and/or concurrently with other blocks from what is depicted and described herein. Moreover, not all illustrated blocks may be required to implement the methods described. It is to be appreciated that the functionality associated with the blocks may be implemented by software, hardware, a combination thereof or any other suitable means (e.g. device, system, process, component). Additionally, it should be further appreciated that the methods disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

FIG. 5 illustrates a method 500 for evaluating tabular data and determining which rows, if any, represent exceptions within the tabular data. Method 500 starts, at 502, where a clustering model is built for the tabular data. The tabular data can be any data, provided such data can be defined as columns, rows, or other entities or fields that can be described as properties that are contained in the columns of the row. The model can be built utilizing a clustering algorithm with predictive capabilities, for example.

The clustering model can leverage data mining technology, which involves searching through large amounts of data to uncover patterns and relationships contained therein. In the data-mining world, there are at least two operations that are performed with data. These operations are training (finding patterns in data) and prediction (applying such patterns to infer new/missing knowledge about data). For example, data mining can be used to explore large detailed business transactions such as credit card transactions to determine the most influential factors common to non-profitable customers.

At 504, the tabular data under evaluation is processed through or compared with the model data to determine whether there are one or more rows that include exceptions that are different from the modeled data. The one or more rows that are ascertained as being exceptions can be marked as such and a potential cause for the exception determined, at 506. Information regarding the exception and the one or more potential causes for the exception can be presented to a user, at 508. The potential causes can include information regarding which column or columns of the respective row are the likely cause of the exception.

The user can take various actions based on the presented information. For example, the exception can be diagnosed as an error in the data collection process, the data entry process, or another problem associated with gathering and/or compiling the data. For such errors, the tabular data can be corrected as appropriate. The exceptions can also be diagnosed as real problems and action can be taken to correct and/or utilize the exceptional data instance. Thus, in accordance with the disclosed embodiments, an exception handling process can benefit when the exceptions are provided and at substantially the same time an explanation of the potential cause of the exception can be provided.

FIG. 6 illustrates a method 600 for finding differences in tabular data and providing reasons for such differences. At 602, a clustering model is built using tabular data and groups of rows that have similar characteristics are detected, at 604. The clustering module can contain various features including a feature to determine the case likelihood of a row, which is the measure of how similar a row is with the clusters detected by the algorithm, and a feature to execute predictions, which can be based on the most common features in the cluster that is closest to a row.

At 606, the tabular data under consideration is processed through the clustering model and rows that have a low likelihood (e.g., those row that are different from the detected clusters or are unlike the most common groups of rows) are detected. A threshold is used, at 608, to determine when a row should be marked as an exception.

At substantially the same time as the row is determined to be an exception, the value computed for each field (e.g., column) of the row is compared, at 610, with a threshold value that is derived from the closest cluster detected by the model. A metric is devised, at 612, for the comparison. The metric can provide information about how far the row is from the closest cluster on the coordinate represented by the respective column.

At substantially the same time as a metric is computed for all the columns, the column yielding the largest distance is chosen and marked as the potential cause of the exception, at 614. This chosen column can be presented to the user in various formats (e.g., highlighted, bold font, italic font, commented, or other indicator).

As data evolves (e.g., new data entered, existing data modified) or periodically, method 600 can return to 602 and the clustering model re-trained and new clusters can be detected. In such a manner, the information can be updated with new rules derived from the new data. It is to be understood that this can be continuous such that the model is re-trained a multitude of times as tabular data changes or is added (or periodically, such as a predetermined interval).

Figure 7:
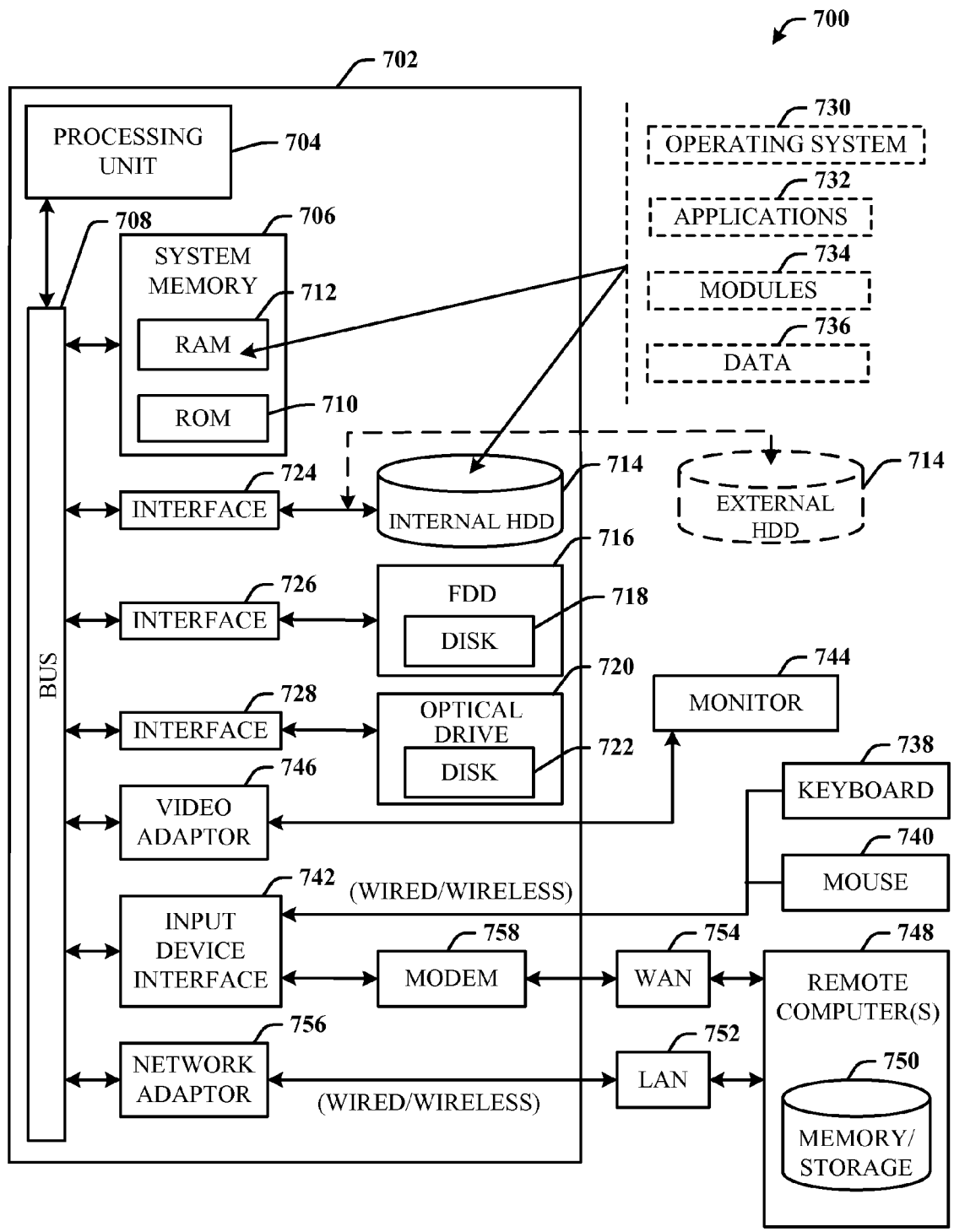
FIG. 7 illustrates a block diagram of a computer operable to execute the disclosed embodiments.

Referring now to FIG. 7, there is illustrated a block diagram of a computer operable to execute the disclosed architecture. In order to provide additional context for various aspects disclosed herein, FIG. 7 and the following discussion are intended to provide a brief, general description of a suitable computing environment 700 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 7, the exemplary environment 700 for implementing various aspects includes a computer 702, the computer 702 including a processing unit 704, a system memory 706 and a system bus 708. The system bus 708 couples system components including, but not limited to, the system memory 706 to the processing unit 704. The processing unit 704 can be any of various commercially available processors. Dual microprocessors and other multi-processor architectures may also be employed as the processing unit 704.

The system bus 708 can be any of several types of bus structure that may further interconnect to a memory bus (with or without a memory controller), a peripheral bus, and a local bus using any of a variety of commercially available bus architectures. The system memory 706 includes read-only memory (ROM) 710 and random access memory (RAM) 712. A basic input/output system (BIOS) is stored in a nonvolatile memory 710 such as ROM, EPROM, EEPROM, which BIOS contains the basic routines that help to transfer information between elements within the computer 702, such as during start-up. The RAM 712 can also include a high-speed RAM such as static RAM for caching data.

The computer 702 further includes an internal hard disk drive (HDD) 714 (e.g., EIDE, SATA), which internal hard disk drive 714 may also be configured for external use in a suitable chassis (not shown), a magnetic floppy disk drive (FDD) 716, (e.g., to read from or write to a removable diskette 718) and an optical disk drive 720, (e.g., reading a CD-ROM disk 722 or, to read from or write to other high capacity optical media such as the DVD). The hard disk drive 714, magnetic disk drive 716 and optical disk drive 720 can be connected to the system bus 708 by a hard disk drive interface 724, a magnetic disk drive interface 726 and an optical drive interface 728, respectively. The interface 724 for external drive implementations includes at least one or both of Universal Serial Bus (USB) and IEEE 1394 interface technologies. Other external drive connection technologies are within contemplation of the one or more embodiments.

The drives and their associated computer-readable media provide nonvolatile storage of data, data structures, computer-executable instructions, and so forth. For the computer 702, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 712, including an operating system 730, one or more application programs 732, other program modules 734 and program data 736. All or portions of the operating system, applications, modules, and/or data can also be cached in the RAM 712. It is appreciated that the various embodiments can be implemented with various commercially available operating systems or combinations of operating systems.

A user can enter commands and information into the computer 702 through one or more wired/wireless input devices, e.g., a keyboard 738 and a pointing device, such as a mouse 740. Other input devices (not shown) may include a microphone, an IR remote control, a joystick, a game pad, a stylus pen, touch screen, or the like. These and other input devices are often connected to the processing unit 704 through an input device interface 742 that is coupled to the system bus 708, but can be connected by other interfaces, such as a parallel port, an IEEE 1394 serial port, a game port, a USB port, an IR interface, etc.

A monitor 744 or other type of display device is also connected to the system bus 708 through an interface, such as a video adapter 746. In addition to the monitor 744, a computer typically includes other peripheral output devices (not shown), such as speakers, printers, etc.

The computer 702 may operate in a networked environment using logical connections through wired and/or wireless communications to one or more remote computers, such as a remote computer(s) 748. The remote computer(s) 748 can be a workstation, a server computer, a router, a personal computer, portable computer, microprocessor-based entertainment appliance, a peer device or other common network node, and typically includes many or all of the elements described relative to the computer 702, although, for purposes of brevity, only a memory/storage device 750 is illustrated. The logical connections depicted include wired/wireless connectivity to a local area network (LAN) 752 and/or larger networks, e.g., a wide area network (WAN) 754. Such LAN and WAN networking environments are commonplace in offices and companies, and facilitate enterprise-wide computer networks, such as intranets, all of which may connect to a global communications network, e.g., the Internet.

When used in a LAN networking environment, the computer 702 is connected to the local network 752 through a wired and/or wireless communication network interface or adapter 756. The adaptor 756 may facilitate wired or wireless communication to the LAN 752, which may also include a wireless access point disposed thereon for communicating with the wireless adaptor 756.

When used in a WAN networking environment, the computer 702 can include a modem 758, is connected to a communications server on the WAN 754, or has other means for establishing communications over the WAN 754, such as by way of the Internet. The modem 758, which can be internal or external and a wired or wireless device, is connected to the system bus 708 through the serial port interface 742. In a networked environment, program modules depicted relative to the computer 702, or portions thereof, can be stored in the remote memory/storage device 750. It will be appreciated that the network connections shown are exemplary and other means of establishing a communications link between the computers can be used.

The computer 702 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 8:
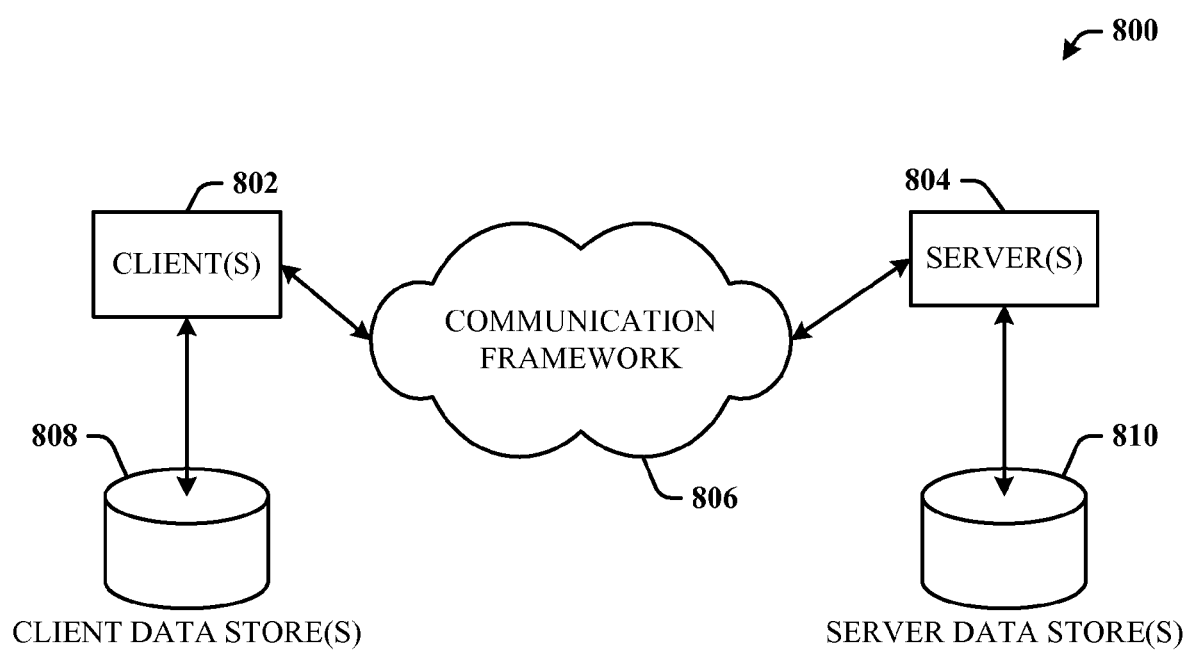
FIG. 8 illustrates a schematic block diagram of an exemplary computing environment operable to execute the disclosed embodiments.

Referring now to FIG. 8, there is illustrated a schematic block diagram of an exemplary computing environment 800 in accordance with the various embodiments. The system 800 includes one or more client(s) 802. The client(s) 802 can be hardware and/or software (e.g., threads, processes, computing devices). The client(s) 802 can house cookie(s) and/or associated contextual information by employing the various embodiments, for example.

The system 800 also includes one or more server(s) 804. The server(s) 804 can also be hardware and/or software (e.g., threads, processes, computing devices). The servers 804 can house threads to perform transformations by employing the various embodiments, for example. One possible communication between a client 802 and a server 804 can be in the form of a data packet adapted to be transmitted between two or more computer processes. The data packet may include a cookie and/or associated contextual information, for example. The system 800 includes a communication framework 806 (e.g., a global communication network such as the Internet) that can be employed to facilitate communications between the client(s) 802 and the server(s) 804.

Communications can be facilitated through a wired (including optical fiber) and/or wireless technology. The client(s) 802 are operatively connected to one or more client data store(s) 808 that can be employed to store information local to the client(s) 802 (e.g., cookie(s) and/or associated contextual information). Similarly, the server(s) 804 are operatively connected to one or more server data store(s) 810 that can be employed to store information local to the servers 804.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." Furthermore, the term "or" as used in either the detailed description or the claims is meant to be a "non-exclusive or".

What is claimed is:

1. A system that facilitates automatic detection of exceptions in tabular data, the system comprising a processor and memory storing computer executable components, the computer executable components comprising:
    an application that contains tabular data expressed as a plurality of rows that include a plurality of columns; and
    a predictive analysis component that receives the tabular data and predicts exceptions in the tabular data utilizing a probabilistic clustering algorithm with predictive capabilities, the predictive analysis component comprising:
        a clustering module that groups the plurality of rows into one or more groups using the clustering algorithm, wherein the plurality of rows are grouped based on similarities between values in the columns of each of the rows in each group, and wherein the clustering module further identifies at least one row from the plurality of rows that is not grouped with at least one other row from the plurality of rows; and
        a predictive module that determines a group to which the identified at least one row is most similar and compares the value of each column in the at least one row to a predicted value for the corresponding column of rows that are grouped into the most similar group, and based on the comparison determines at least one column of the identified at least one row that contains a value that is most different from the corresponding predicted value such that the at least one column is identified as having caused the identified at least one row to not be grouped with the most similar group.

2. The system of claim 1, wherein, for each row, the probabilistic clustering algorithm generates a data point in a multi-dimensional bell curve that has peaks and troughs, and wherein a peak represents one of the one or more groups such that as a data point moves away from a particular peak, the probability that the row represented by the data point is within the group represented by the particular peak diminishes.

3. The system of claim 2, wherein the group to which the identified at least one row is most similar is determined by finding the peak to which the data point representing the identified at least one row is closest.

4. The system of claim 1, further comprising a refresh module that periodically invokes the predictive analysis component to reevaluate the predicted exceptions when tabular data is modified, deleted or added.

5. The system of claim 1, further comprising a display component that presents the exceptions to a user.

6. The system of claim 1, the predictive analysis component is executed on a server independent of the location of the tabular data.

7. The system of claim 1, further comprising an interface component that allows a user to interact with the tabular data or the predictive analysis component.

8. The system of claim 1, the tabular data is contained in a spreadsheet application.

9. The system of claim 1, the tabular data is contained in an XML application.

10. A method for exception detection, comprising:
building a predictive clustering model on tabular data using a probabilistic clustering algorithm, wherein the clustering model comprises a plurality of groups of rows, wherein the rows are grouped based on similarities between values in the columns of each of the rows in each group, the clustering model being stored in computer storage media of a computer device;
comparing, by a processor of the computer device, each row contained in the tabular data to the clustering model;
ascertaining, by the processor of the computer device, one or more rows that are an exception by determining that the differences between the one or more rows and the group that is most similar to the row are greater than a threshold; and
presenting, by the processor of the computer device, the one or more rows that are an exception to a user including identifying at least one column of each of the one or more rows that caused the one or more rows to be ascertained as exceptions by comparing the value of each column in the one or more rows to a predicted value for the corresponding column of rows that are grouped into the most similar group and determining one or more particular columns that contain values that are most different from the corresponding predicted value such that the one or more particular columns are identified as having caused the row to be an exception.

11. The method of claim 10, wherein, for each row, the probabilistic clustering algorithm generates a data point in a multi-dimensional bell curve that has peaks and troughs, and wherein a peak represents one of the one or more groups such that as a data point moves away from a particular peak, the probability that the row represented by the data point is within the group represented by the particular peak diminishes.

12. The method of claim 11, wherein the group to which the identified at least one row is most similar is determined by finding the peak to which the data point representing the identified at least one row is closest.

13. The method of claim 10, further comprising:
periodically updating the clustering model;
determining if a different row is a new exception; and
presenting the new exception to a user.

14. The method of claim 10, wherein building a predictive clustering model on tabular data is performed on a machine independent of the location of the data.

15. A computer storage medium storing computer executable instructions which when executed by a processor of a computer system perform any one of the methods of claims 10, 11, 12, 13, or 14.

* * * * *